(12) United States Patent
Tsuchiya et al.

(10) Patent No.: US 10,504,664 B2
(45) Date of Patent: Dec. 10, 2019

(54) COVER AND MODULE USING THE SAME

(71) Applicant: TAIYO YUDEN CO., LTD., Chuo-ku, Tokyo (JP)

(72) Inventors: Takayuki Tsuchiya, Takasaki (JP); Shinji Ishii, Takasaki (JP); Toshifumi Matsutaka, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/895,957

(22) Filed: Feb. 13, 2018

(65) Prior Publication Data

US 2018/0240610 A1 Aug. 23, 2018

(30) Foreign Application Priority Data

Feb. 17, 2017 (JP) .................................. 2017-027988

(51) Int. Cl.
*H01G 11/82* (2013.01)
*H01G 11/06* (2013.01)
(Continued)

(52) U.S. Cl.
CPC .............. *H01G 11/82* (2013.01); *H01G 2/06* (2013.01); *H01G 11/16* (2013.01); *H01G 11/60* (2013.01);
(Continued)

(58) Field of Classification Search
CPC ........ H01G 11/82; H01G 11/18; H01G 11/06; H01G 11/16; H01G 11/60
(Continued)

(56) References Cited

U.S. PATENT DOCUMENTS

| 6,231,370 B1* | 5/2001 | Morin | .................. H01R 12/57 361/807 |
| 6,555,746 B2* | 4/2003 | Boyd  | .................. H05K 3/301 174/135 |

(Continued)

FOREIGN PATENT DOCUMENTS

| JP | S4858947 U | 7/1973 |
| JP | S5428061 U | 2/1979 |

(Continued)

OTHER PUBLICATIONS

A Notification of Reasons for Refusal issued by the Japanese Patent Office, dated Nov. 27, 2018, for related Japanese application No. 2017-027988. (7 pages).

*Primary Examiner* — Rockshana D Chowdhury
(74) *Attorney, Agent, or Firm* — Law Office of Katsuhiro Arai (57) ABSTRACT

A cover is made for electric storage device including: a container which is placed on one principal face of a board having a first through hole for a terminal and a second through hole for a terminal, and which has a first end face orthogonal to the one principal face; and a positive-electrode terminal and a negative-electrode terminal, both projecting from the first end face and then being bent, with their ends penetrating through the first through hole for a terminal and the second through hole for a terminal, respectively, and led out from the other principal face of the board. The first cover is placed on the one principal face side of the board, and forms, together with the first end face and the first principal face, a first housing part for terminals that houses the positive-electrode terminal and the negative-electrode terminal.

10 Claims, 9 Drawing Sheets

(51) Int. Cl.
*H01G 11/60* (2013.01)
*H01G 11/16* (2013.01)
*H01G 11/74* (2013.01)
*H01G 2/06* (2006.01)
*H01G 11/18* (2013.01)

(52) U.S. Cl.
CPC .............. *H01G 11/74* (2013.01); *H01G 11/06* (2013.01); *H01G 11/18* (2013.01); *Y02E 60/13* (2013.01)

(58) Field of Classification Search
USPC ......................................................... 361/728
See application file for complete search history.

(56) References Cited

U.S. PATENT DOCUMENTS 6,717,797 B1 * 4/2004 Martin .................. H05K 7/12
174/559
6,927,337 B2 * 8/2005 Kobayashi .......... B60R 16/0239
174/535
8,861,225 B2 * 10/2014 Kodama ................ H01G 2/106
361/782
2015/0216088 A1 * 7/2015 Kawai .................. H05K 1/0203
361/710

FOREIGN PATENT DOCUMENTS

| | | |
|---|---|---|
| JP | S59103472 U | 7/1984 |
| JP | S6165491 A | 4/1986 |
| JP | S61119371 U | 7/1986 |
| JP | S61127656 U | 8/1986 |
| JP | S6242486 A | 2/1987 |
| JP | S6452300 U | 3/1989 |
| JP | H01168951 U | 11/1989 |
| JP | H02787 U | 1/1990 |
| JP | H0897090 A | 4/1996 |
| JP | H11233921 A | 8/1999 |
| JP | H11258665 A | 9/1999 |
| JP | 2007220963 A | 8/2007 |
| JP | 2010272637 A | 12/2010 |
| JP | 2014165466 A | 9/2014 |
| JP | 2018026219 A | 2/2018 |

* cited by examiner

COVER AND MODULE USING THE SAME

BACKGROUND

Field of the Invention

The present invention relates to a cover for protecting the positive-electrode terminal and negative-electrode terminal of a lithium ion capacitor or other electric storage device, as well as a module using such cover.

Description of the Related Art

A lithium ion capacitor module comprising a lithium ion capacitor of high capacitance density that can be charged and discharged repeatedly, has a wiring board and the lithium ion capacitor placed on the wiring board. The lithium ion capacitor is constituted in such a way that an electric storage element comprising a positive-electrode layer, a negative-electrode layer, and separators placed in between, is housed in a cylindrical container together with electrolyte, for example. A positive-electrode terminal that electrically connects to the positive-electrode layer, and a negative-electrode terminal that electrically connects to the negative-electrode layer, are led out from one end face of the container.

The lithium ion capacitor is such that, when the positive-electrode terminal and the negative-electrode terminal connect to each other electrically, either by direct contact or via conductive material, the lithium ion capacitor shorts, and excessive current flows through the lithium ion capacitor. As a result, the temperature and pressure inside the container rise and, in some cases, the pressure valve actuates and the gas inside the container is released. Once its pressure valve has actuated, the lithium ion capacitor can no longer be used. For this reason, the positive-electrode terminal and the negative-electrode terminal must be kept insulated from each other at a step to install the lithium ion capacitor on a wiring board and assemble them into a module, at a step to assemble the module into electronic equipment, and after the module has been assembled into the electronic equipment, etc., in order to prevent an external short circuit.

To place a cylindrical lithium ion capacitor on a wiring board and assemble them into a module, for example, the assembly follows the steps whereby the lithium ion capacitor is placed on one principal face of the wiring board, its positive-electrode terminal and negative-electrode terminal are guided through the through holes provided in the wiring board, and the ends of the positive-electrode terminal and negative-electrode terminal are led out onto the other principal face of the wiring board. To prevent an external short circuit caused by direct contact, etc., between the end of the positive-electrode terminal and that of the negative-electrode terminal, which are each led out onto the other principal face of the wiring board, an insulation sheet is attached to the other principal face of the wiring board in a manner covering the positive-electrode terminal and the negative-electrode terminal, for example.

Depending on the electronic equipment into which the module is assembled, the lithium ion capacitor may be placed horizontally with its longitudinal direction running in parallel with the wiring board, due to space limitations for installing the module. If the lithium ion capacitor is placed horizontally on the wiring board, the one end face of the container from which the positive-electrode terminal and negative-electrode terminal are projecting, is placed at a right angle to the wiring board. For this reason, the positive-electrode terminal and negative-electrode terminal are bent in an L shape, and the ends of the positive-electrode terminal and negative-electrode terminal are led out to the other principal face side of the wiring board (refer to Patent Literature 1, for example).

Patent Literature 1 describes providing a projection between a pair of lead terminals of a main capacitor placed inside a film unit with lens, in order to prevent short-circuiting between the lead terminals. According to Patent Literature 1, the lead terminals of the main capacitor are placed in an exposed state inside the unit.

BACKGROUND ART LITERATURES

[Patent Literature 1] Japanese Patent Laid-open No. Hei 11-258665

SUMMARY

According to the constitution described in Patent Literature 1, however, the positive-electrode terminal may short with the negative-electrode terminal due to entry of foreign matter, etc., because the terminals are exposed inside the unit.

In light of the aforementioned situations, an object of the present invention is to provide a cover for electric storage devices for protecting positive and negative-electrode terminals that can prevent an external short circuit in a module in which a lithium ion capacitor or other electric storage device of horizontal type is used, and also to provide a module using such cover.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the cover pertaining to an embodiment of the present invention comprises a first cover.

This cover is a cover for an electric storage device comprising: a container placed on one principal face of a board having a first through hole for a terminal and a second through hole for a terminal, which has a first end face crossing at a right angle to the one principal face; and a positive-electrode terminal and a negative-electrode terminal, both projecting from the first end face and then being bent, with their ends penetrating through the first through hole for a terminal and the second through hole for a terminal, respectively, and led out from the other principal face of the board.

The first cover is placed on the one principal face side of the board and forms, together with the first end face and the one principal face, a first housing part for terminals that houses the positive-electrode terminal and the negative-electrode terminal.

According to such constitution of the present invention, entry of foreign matter is prevented by the cover, and therefore short-circuiting between the positive-electrode terminal and the negative-electrode terminal, which would otherwise be caused by entry of foreign matter, can be prevented. As a result, rise in the temperature and pressure inside the electric storage device, which would otherwise be caused by an external short circuit, can be prevented.

The first housing part for terminals may have a positive-electrode terminal housing part that houses the positive-electrode terminal, and a negative-electrode terminal housing part that houses the negative-electrode terminal, with the two housing parts being isolated from each other.

According to such constitution, the positive-electrode terminal and the negative-electrode terminal can be kept insulated from each other, and short-circuiting due to direct contact, or short-circuiting via conductive foreign matter, etc., between the positive-electrode terminal and the negative-electrode terminal, can be prevented.

The first cover may have a bulkhead that isolates the positive-electrode terminal housing part and the negative-electrode terminal housing part.

A second cover may be further provided, which is placed on the other principal face side, and forms, together with the other principal face, a second terminal housing part that houses the positive-electrode terminal and the negative-electrode terminal, and which can engage with the first cover.

As described above, the cover may be constituted by the first cover and the second cover that can engage with each other via the board. The first cover can house the positive-electrode terminal and negative-electrode terminal positioned on one principal face side of the board, while the second cover can house the ends of the positive-electrode terminal and negative-electrode terminal positioned on the other principal face side of the board.

The second terminal housing part may have a positive-electrode terminal housing part that houses an end of the positive-electrode terminal, and a negative-electrode terminal housing part that houses an end of the negative-electrode terminal, with the two housing parts being isolated from each other.

According to such constitution, the positive-electrode terminal housing part and the negative-electrode terminal housing part can be isolated from each other by a first concaved part and a second concaved part, and the positive-electrode terminal and the negative-electrode terminal can be kept isolated from each other as a result.

The first cover may have an engagement hole, while the second cover may have a projecting part with an engagement tab that penetrates through the through hole for engagement provided in the board and engages with the engagement hole.

According to such constitution, releasing the engagement between the first cover and the second cover can be made difficult.

To achieve the aforementioned object, the module pertaining to an embodiment of the present invention comprises a board, an electric storage device, and a cover.

The board has a first through hole for a terminal and a second through hole for a terminal.

The electric storage device comprises: a container placed on one principal face of the board, and having a first end face and a second end face which are placed in a manner facing each other along one axis direction running in parallel with the board; a positive-electrode terminal which projects from the first end face in the one axis direction and is bent in a manner crossing at a right angle to the one axis direction, with its end penetrating through the first through hole for a terminal and led out from the other principal face of the board; and a negative-electrode terminal which projects from the first end face in the one axis direction and is bent in a manner crossing at a right angle to the one axis direction, with its end penetrating through the second through hole for a terminal and led out from the other principal face of the board.

The cover comprises a first cover which is placed on the one principal face side of the board and forms, together with the first end face and the one principal face, a first housing part for terminals that houses the positive-electrode terminal and the negative-electrode terminal.

According to such constitution of the present invention, entry of foreign matter is prevented by the cover, and therefore short-circuiting between the positive-electrode terminal and the negative-electrode terminal, which would otherwise be caused by entry of foreign matter, can be prevented, and therefore rise in the temperature and pressure inside the electric storage device, which would otherwise be caused by an external short circuit, can be prevented. Accordingly, a module free from problems caused by an external short circuit can be provided in a stable manner.

The first housing part for terminals may have a positive-electrode terminal housing part that houses the positive-electrode terminal, and a negative-electrode terminal housing part that houses the negative-electrode terminal, with the two housing parts being isolated from each other.

The cover may further have a second cover which is placed on the other principal face side, and forms, together with the other principal face, a second terminal housing part that houses the positive-electrode terminal and the negative-electrode terminal, and which can engage with the first cover.

The second terminal housing part may have a positive-electrode terminal housing part that houses the end of the positive-electrode terminal, and a negative-electrode terminal housing part that houses the end of the negative-electrode terminal, with the two housing parts being isolated from each other.

The board may have a through hole for engagement, the first cover may have an engagement hole, and the second cover may have a projecting part with an engagement tab that penetrates through the through hole for engagement and the engagement hole and engages with the engagement hole.

According to such constitution, releasing the engagement between the first cover and the second cover can be made difficult so that, even when an external impact is applied to the module, the first cover and the second cover will not separate from each other easily and a state where entry of foreign matter is prevented by the covers can be maintained.

According to the present invention, a cover for lithium ion capacitor or other electric storage device that can prevent an external short circuit, as well as a module using such cover, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

1—Module
2—Wiring board (Board)
3—Lithium ion capacitor (Electric storage device)
4—Protective cover
21—First through hole for engagement
22—Second through hole for engagement
23—First principal face (One principal face)
24—Second principal face (The other principal face)
25—First through hole for a terminal
26—Second through hole for a terminal
31—Positive-electrode terminal
32—Negative-electrode terminal
33—Container
34—First end face
35—Second end face
41—Top protective cover (First cover)
42—Bottom protective cover (Second cover)
51—Positive-electrode terminal housing part
52—Negative-electrode terminal housing part
61—First housing part for terminals
62—Second terminal housing part
411—First engagement hole
412—Second engagement hole
413—Flange part
415—Bulkhead
421—First projecting part
422—Second projecting part
423—First concaved part (Positive-electrode terminal housing part)
424—Second concaved part (Negative-electrode terminal housing part)
511—Top positive-electrode terminal housing part
512—Bottom positive-electrode terminal housing part
521—Top negative-electrode terminal housing part
522—Bottom negative-electrode terminal housing part
4211a—First engagement tab
4221a—Second engagement tab

DETAILED DESCRIPTION OF EMBODIMENTS

Embodiments of the present invention are explained below by referring to the drawings.

First Embodiment

[Constitution of Module]

Figure 1:
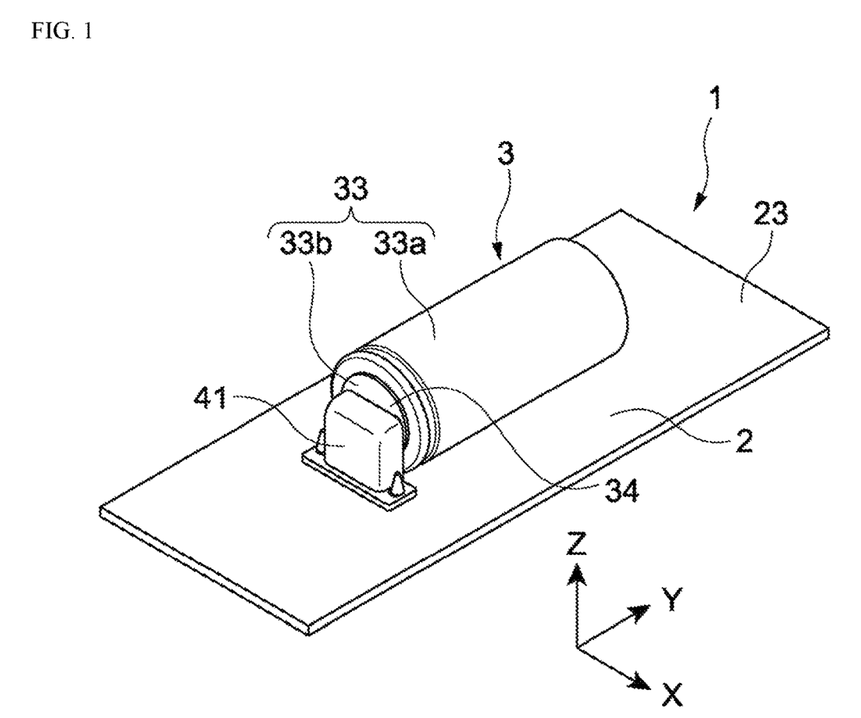
FIG. 1 is a perspective view, from above, of the module pertaining to an embodiment of the present invention.
Figure 2:
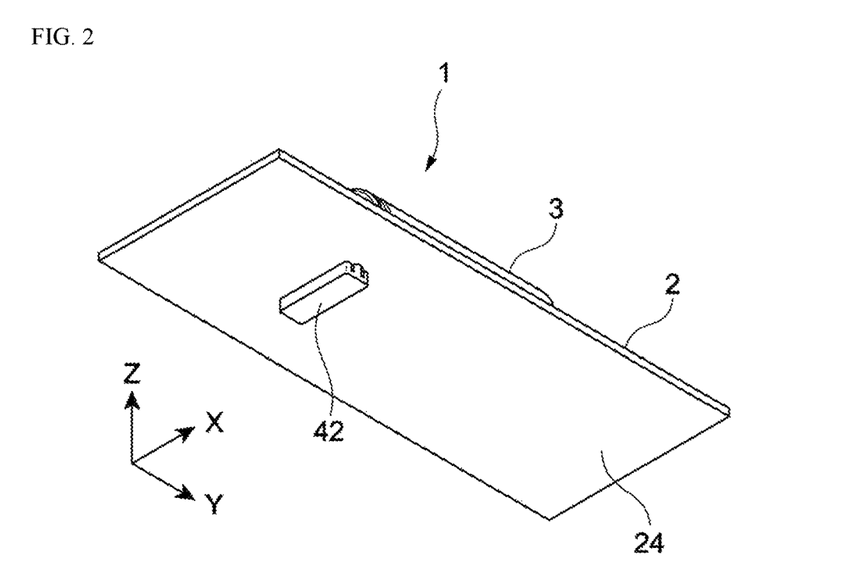
FIG. 2 is a perspective view of the module from below.
Figure 3:
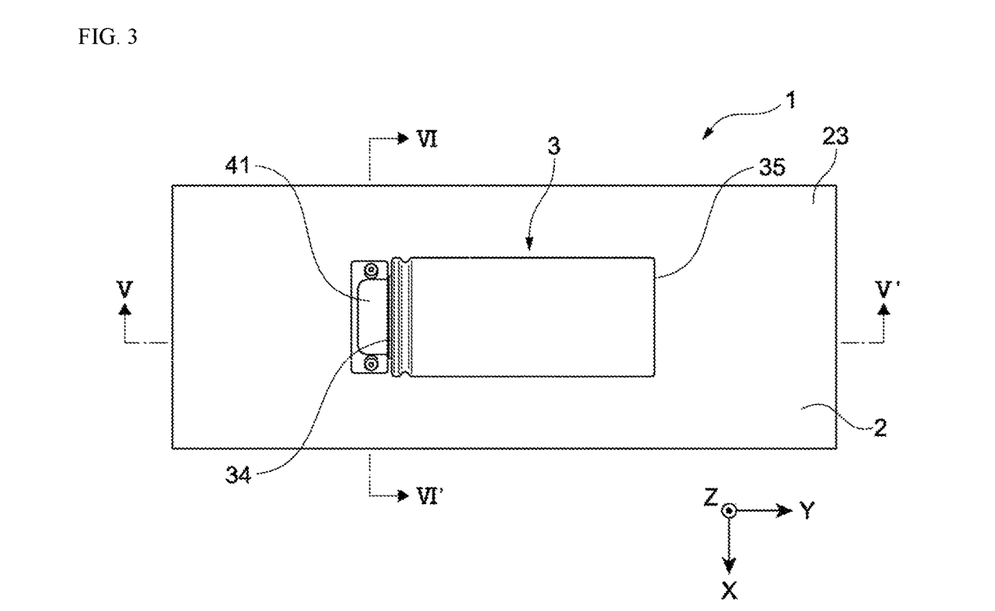
FIG. 3 is a top view of the module.
Figure 4:
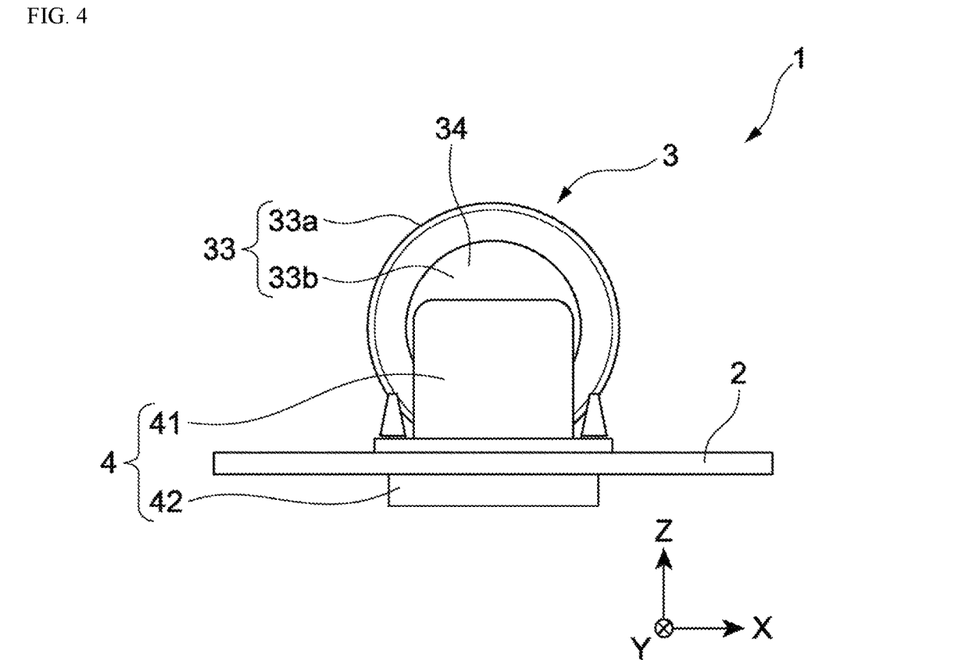
FIG. 4 is a front view of the module.
Figure 5:
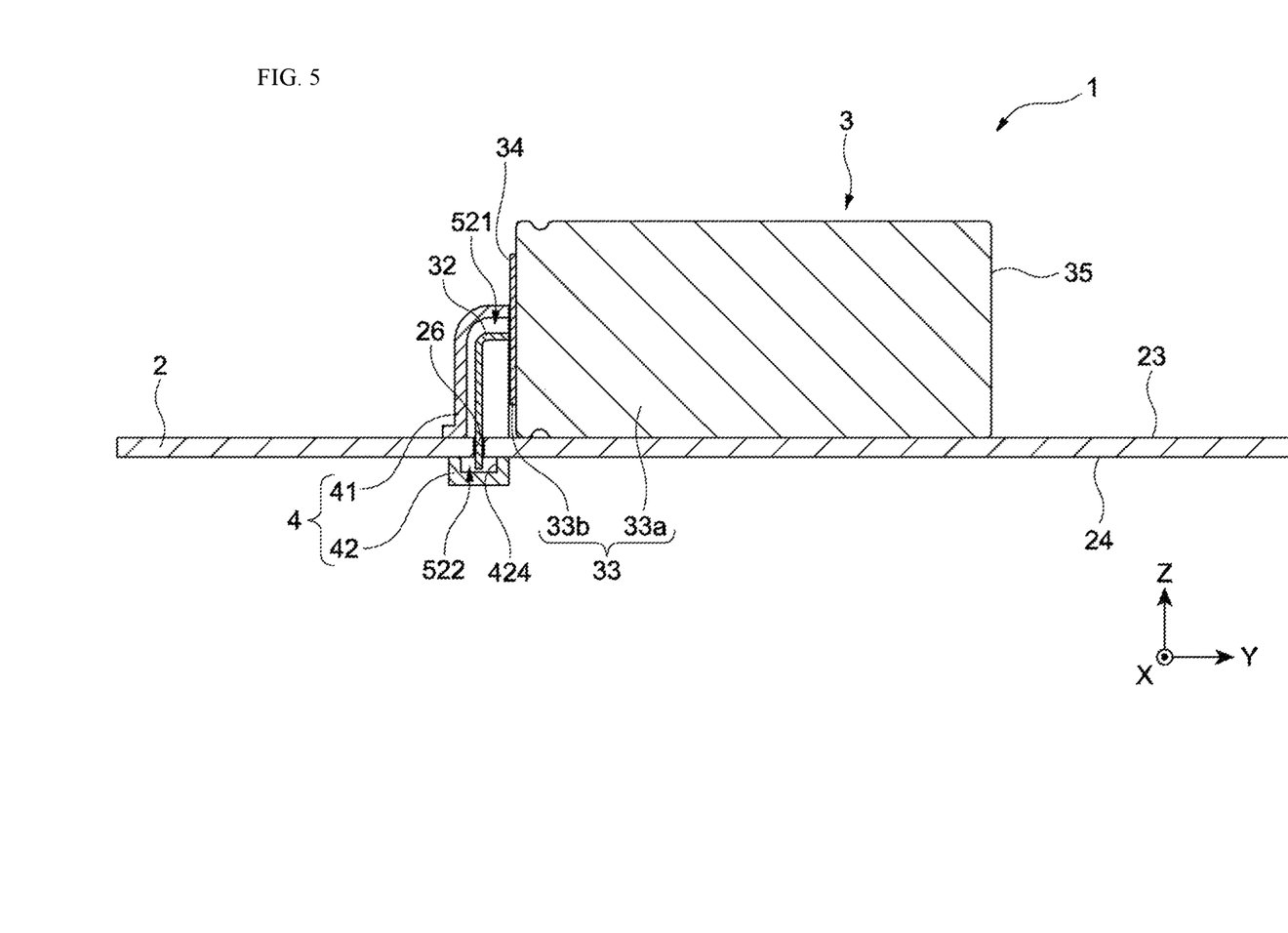
FIG. 5 is a cross-sectional view of the module cut along line V-V' in FIG. 3.
Figure 6:
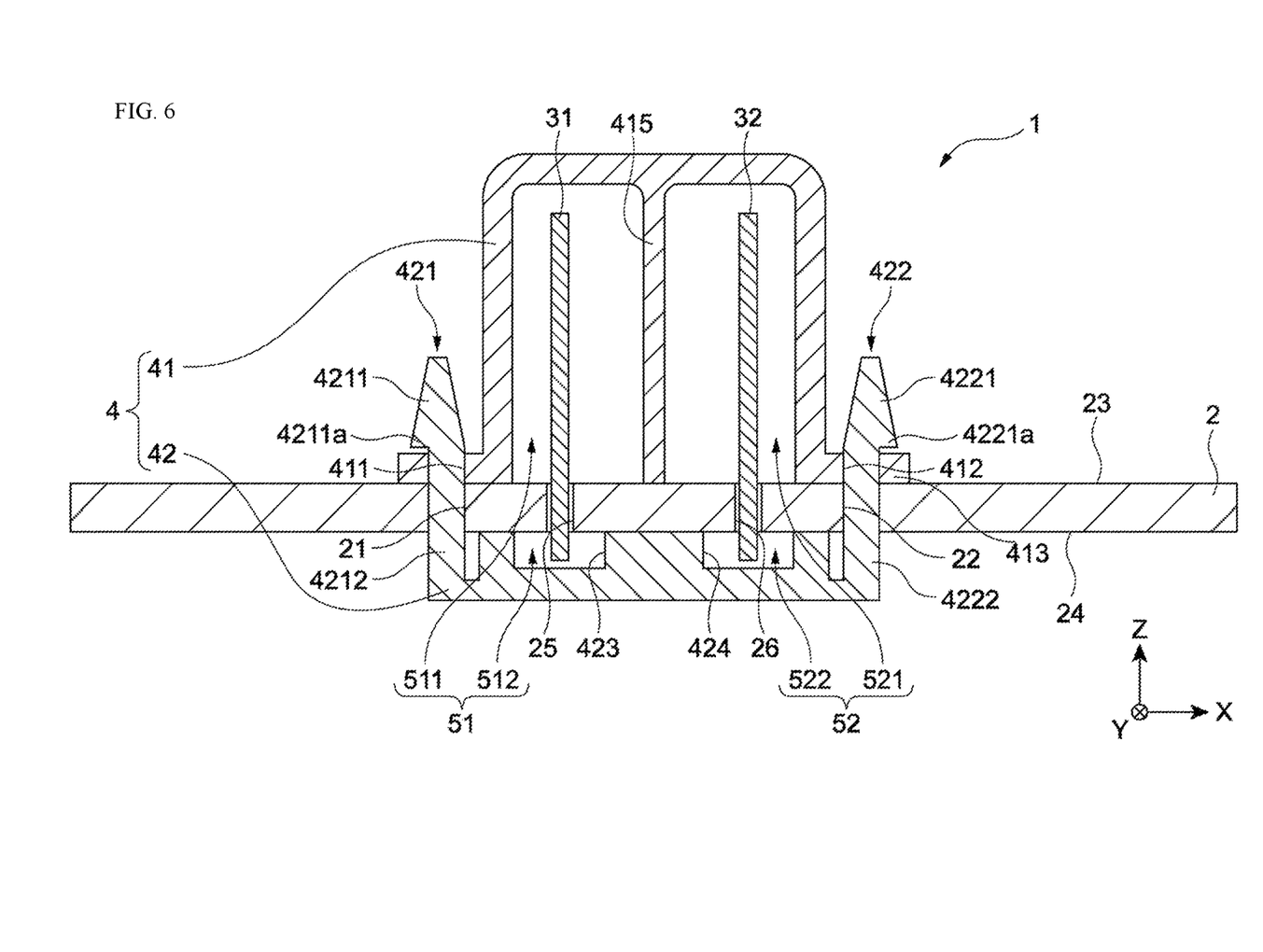
FIG. 6 is a schematic cross-sectional view of the module cut along line VI-VI' in FIG. 3.

FIG. 1 is a perspective view from above, FIG. 2 is a perspective view from below, FIG. 3 is a top view, FIG. 4 is a front view, FIG. 5 is a cross-sectional view cut along line V-V' in FIG. 3, and FIG. 6 is a schematic cross-sectional view cut along line VI-VI' in FIG. 3, of the module pertaining to an embodiment of the present invention. In FIG. 5, the electric storage element housed in the container for the lithium ion capacitor is not illustrated, and the cross-section of the container is indicated by diagonal lines.

It should be noted that, in each figure, the X-axis, Y-axis and Z-axis directions represent three axis directions that are crossing at a right angle to one another.

A module 1 in this embodiment is constituted as a lithium ion capacitor module. The module 1 comprises a wiring board 2, a lithium ion capacitor 3 as an electric storage device, and a protective cover 4.

As a board, the wiring board 2 has a first principal face (one principal face) 23 and a second principal face (other principal face) 24 that are facing away from each other. The wiring board 2 has, formed in its thickness direction, a first through hole for engagement 21 ("a first engagement through hole"), a second through hole for engagement 22 ("a second engagement through hole"), a first through hole for a terminal 25 ("a first terminal through hole"), and a second through hole for a terminal 26 ("a second terminal through hole"). It should be noted that the size of the wiring board 2 is not limited to the size illustrated.

The first engagement through hole 21, second engagement through hole 22, first terminal through hole 25, and second terminal through hole 26, are placed in a single line along the X-axis direction. The first engagement through hole 21 and the second engagement through hole 22 are placed, respectively, on both sides of the first and second terminal through holes 25, 26 that are placed side by side, in a manner sandwiching the first and second terminal through holes 25, 26.

The lithium ion capacitor 3 comprises a cylindrical container 33 having a first end face 34 and a second end face 35 that are facing away from each other, as well as a positive-electrode terminal 31 and a negative-electrode terminal 32 that project from the first end face 34.

The container 33 is constituted by a cylindrical container body 33a with a bottom (corresponding to the second end face 35), and a lid 33b placed on the first end face 34 side and sealing the container body 33a. The positive-electrode terminal 31 is longer than the negative-electrode terminal 32, so the positive-electrode terminal 31 and the negative-electrode terminal 32 are easily distinguishable. It should be noted that, in this embodiment, the positive-electrode terminal 31 and the negative-electrode terminal 32 are illustrated as having the same length for the sake of convenience.

The electric storage element and electrolyte are housed in the container 33. The electric storage element has: a positive electrode sheet comprising a positive-electrode layer stacked with a positive-electrode collector; a negative-electrode sheet comprising a negative-electrode layer stacked with a negative-electrode collector; and separators separating the positive-electrode layer and the negative-electrode layer. A sheet-shaped laminate comprising the separator, positive-electrode sheet, separator, and negative-electrode sheet, stacked together in the thickness direction, is wound around a core axis and housed in the container 33.

In the lithium ion capacitor 3, the electric storage element is sealed in the container 33 together with an electrolyte constituted by an organic solvent solution of lithium salt. The positive-electrode layer is constituted in the shape of a sheet that contains active carbon, PAS (polyacenic semiconductor) or other positive-electrode active material. The negative-electrode layer is constituted in the shape of a sheet that contains graphite, non-graphitizable carbon, PAS, or other negative-electrode active material capable of occluding lithium ions. The separators are constituted by porous cellulose-based material, etc., capable of letting ions pass through them in their thickness direction. For the positive-electrode collector, aluminum, titanium, or other conductive metal foil may be used. For the negative-electrode collector, copper, stainless steel, nickel, alloy thereof, or other conductive metal foil may be used.

Figure 7:
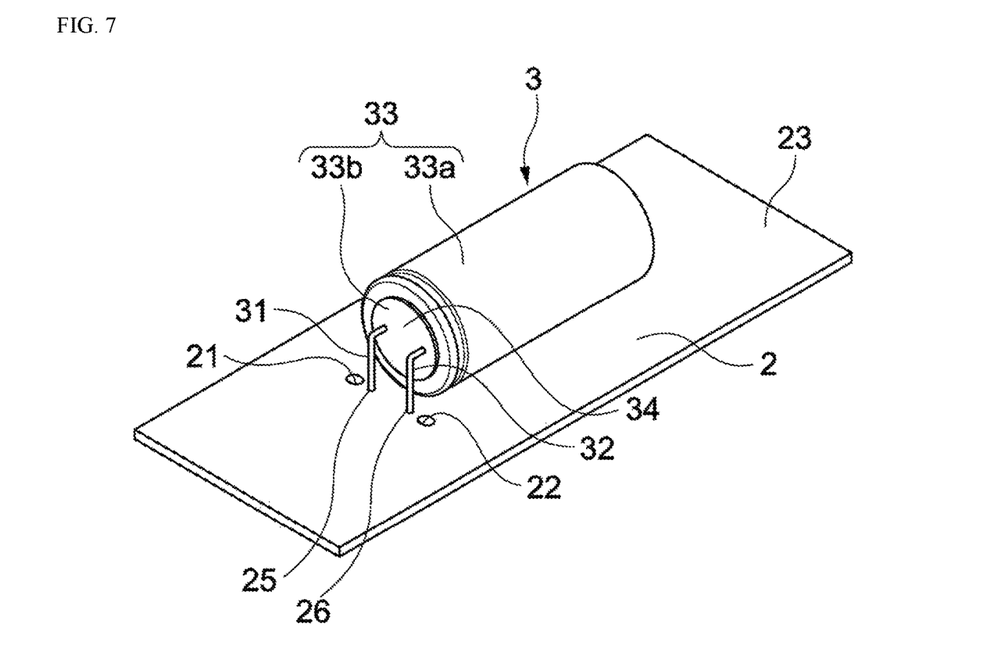
FIG. 7 is a perspective view, from above, of the module without the protective cover.
Figure 8:
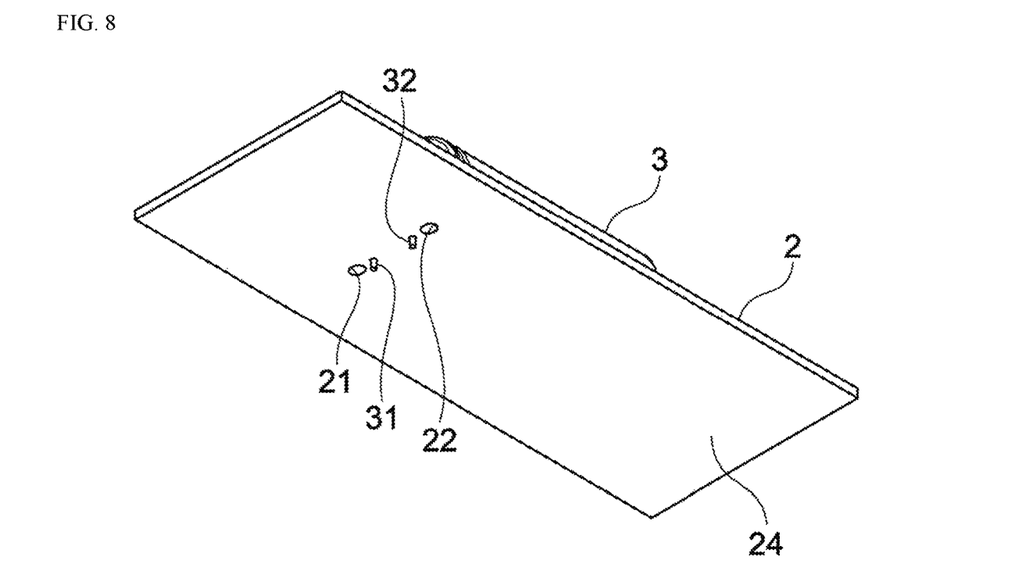
FIG. 8 is a perspective view, from below, of the module without the protective cover as shown in FIG. 7.

FIG. 7 is a perspective view from above, while FIG. 8 is a perspective view from below, of the module 1 without the protective cover 4.

The positive-electrode terminal 31 is connected to the positive-electrode collector, while the negative-electrode terminal 32 is connected to the negative-electrode collector. As shown in FIGS. 7 and 8, the positive-electrode terminal 31 and the negative-electrode terminal 32 each penetrate through the lid 33b of the container 33 from the inner side to the outer side, and are led out to the outer side of the container 33.

The lithium ion capacitor 3 has a longitudinal direction that runs in parallel with one axis direction (Y-axis direction in the figures) through the first end face 34 and the second end face 35 that are facing away from each other, and the lithium ion capacitor 3 is placed on the first principal face 23 of the wiring board 2 in such a way that its longitudinal direction becomes parallel with the first principal face 23. The lithium ion capacitor 3 is placed horizontally on the wiring board 2 so that the first end face 34 of the lithium ion capacitor 3 crosses at a right angle to the first principal face 23 of the wiring board 2. It should be noted that a state where the first end face 34 crosses at a right angle to the first principal face 23 also includes a state where the angle formed by the two faces is not exactly 90°, but approximately 90° instead, where they are slightly offset from each other.

The positive-electrode terminal 31 and the negative-electrode terminal 32 each have an L shape, projecting from the first end face 34 in parallel with the longitudinal direction of the lithium ion capacitor 3 and then bent midway roughly at a right angle. After being bent midway roughly at a right angle, the positive-electrode terminal 31 and negative-electrode terminal 32 penetrate, respectively, through the first terminal through hole 25 and second terminal through hole 26 that are provided in the wiring board 2, with their ends projecting and led out from the second principal face 24.

As shown in FIGS. 1 to 6, the protective cover 4 covers and protects the positive-electrode terminal 31 and the negative-electrode terminal 32. The protective cover 4 has a top protective cover 41 which is a first cover placed on the first principal face 23 side of the wiring board 2, and a bottom protective cover 42 which is a second cover placed on the second principal face 24 side. The top protective cover 41 and the bottom protective cover 42 are constituted in such a way that they can engage with each other via the wiring board 2.

The detailed structure of the protective cover 4 is explained below.

[Constitution of Protective Cover]

The constitution of the protective cover 4 is explained using FIGS. 6 and 9 through 14.

Figure 9:
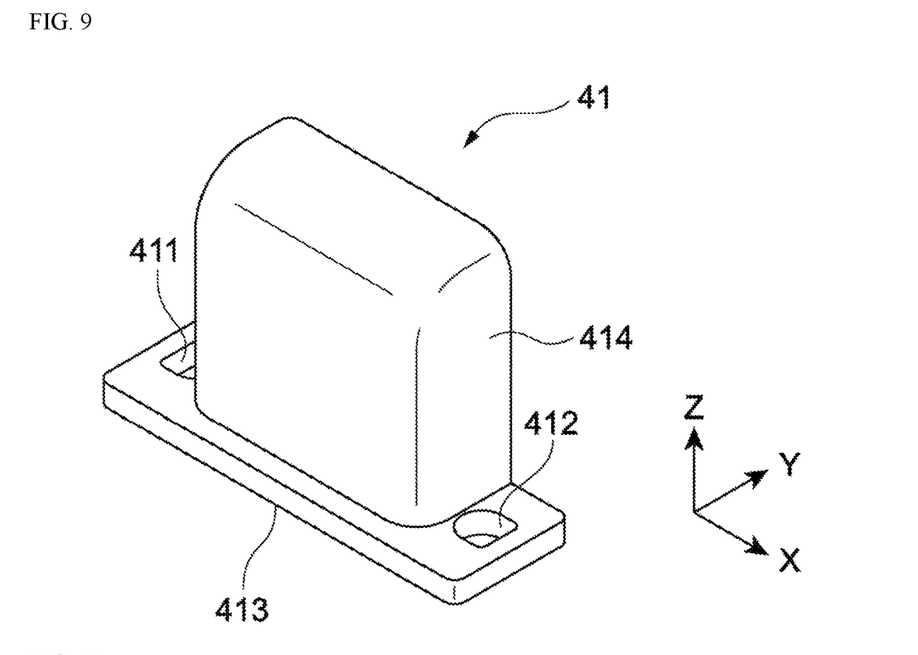
FIG. 9 is a perspective view, from a direction diagonal to the front face, of the top protective cover constituting a part of the protective cover assembled into the module.
Figure 10:
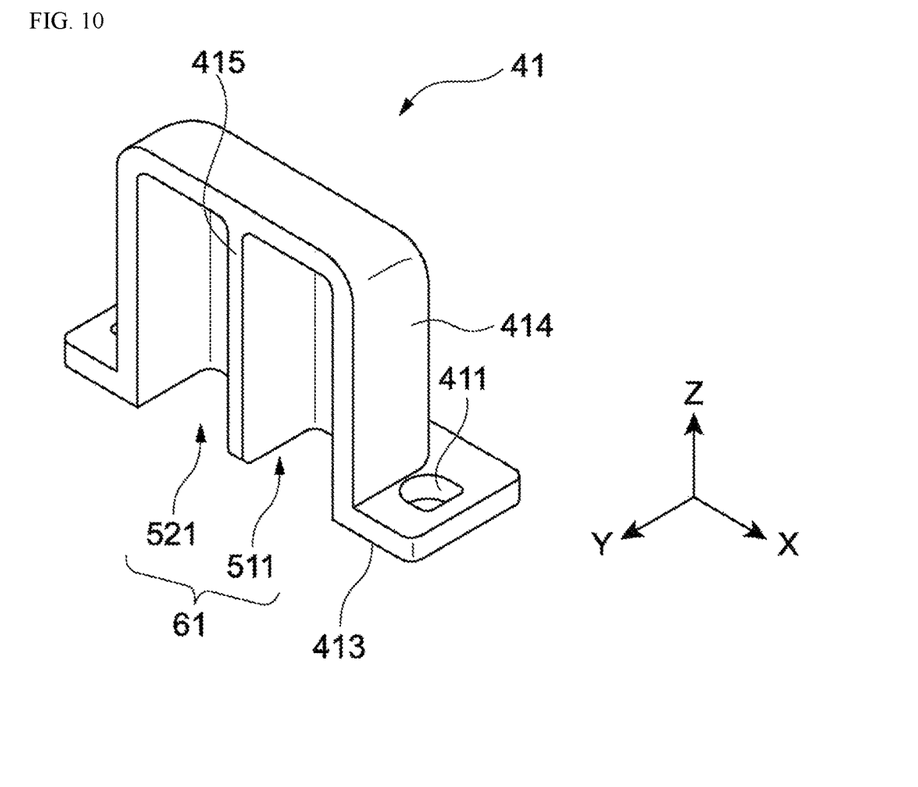
FIG. 10 is a perspective view, from a direction diagonal to the rear face, of the top protective cover shown in FIG. 9.
Figure 11:
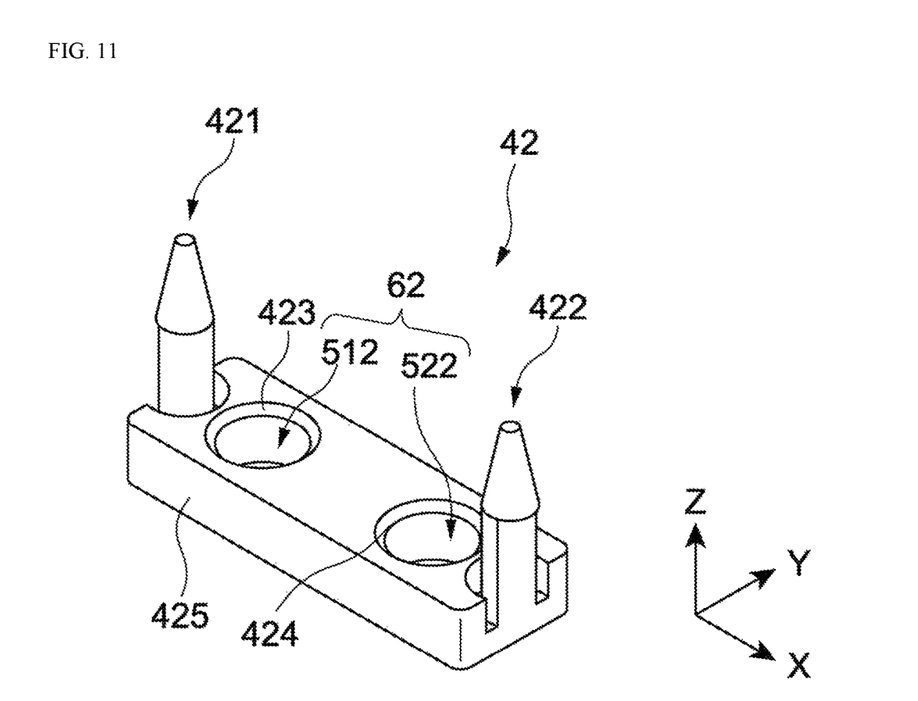
FIG. 11 is a perspective view, from above, of the bottom protective cover constituting a part of the protective cover assembled into the module.
Figure 12:
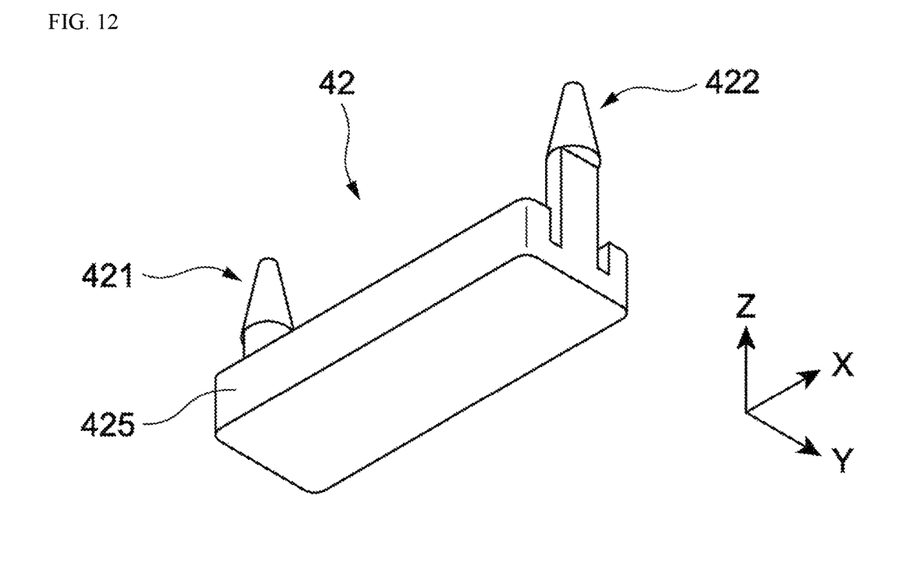
FIG. 12 is a perspective view, from below, of the bottom protective cover shown in FIG. 11.
Figure 13:
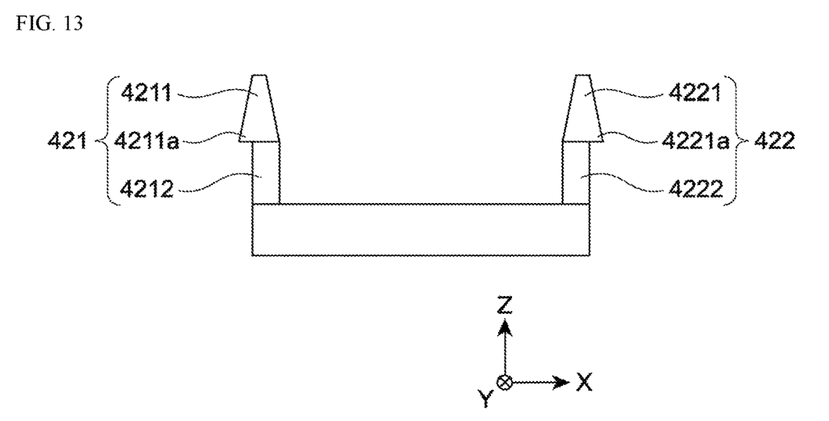
FIG. 13 is a side view of the bottom protective cover shown in FIG. 11.
Figure 14:
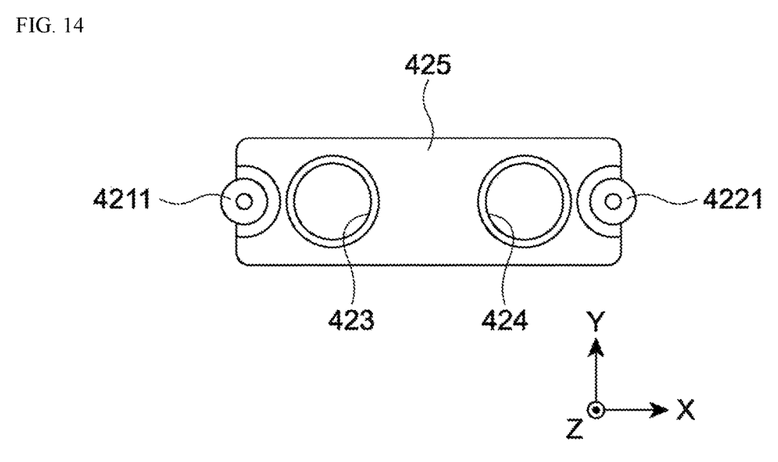
FIG. 14 is a top view of the bottom protective cover shown in FIG. 11.

FIG. 6 is a schematic view explaining the position relationship of the positive-electrode terminal 31, negative-electrode terminal 32, and protective cover 4, using a different scale for each part of the constitution for the sake of convenience. FIG. 9 is a perspective view from a direction diagonal to the front face, while FIG. 10 is a perspective view from a direction diagonal to the rear face, of the top protective cover 41. FIGS. 11 to 14 are a perspective view from above, a perspective view from below, a side view, and a top view, of the bottom protective cover 42, respectively.

As shown in FIG. 6, the protective cover 4 has a positive-electrode terminal housing part 51 that houses the positive-electrode terminal 31, and a negative-electrode terminal housing part 52. The positive-electrode terminal housing part 51 comprises a top positive-electrode terminal housing part 511 which is partitioned by a bulkhead 415, mentioned below, of the top protective cover 41, as well as a bottom positive-electrode terminal housing part 512 which is formed by a first concaved part 423, mentioned below, of the bottom protective cover 42. The negative-electrode terminal housing part 52 comprises a top negative-electrode terminal housing part 521 which is partitioned by the bulkhead of the top protective cover 41, as well as a bottom negative-electrode terminal housing part 522 which is formed by a second concaved part 424 of the bottom protective cover 42.

This way, the positive-electrode terminal 31 and the negative-electrode terminal 32 are protected by the protective cover 4 against entry of foreign matter from the outside, and consequently short-circuiting caused by entry of foreign matter can be prevented. Furthermore, the positive-electrode terminal 31 and negative-electrode terminal 32 are housed, respectively, in the positive-electrode terminal housing part 51 and negative-electrode terminal housing part 52 that are isolated from each other, and therefore the positive-electrode terminal 31 and the negative-electrode terminal 32 are kept insulated from each other. Accordingly, short-circuiting by direct contact between the positive-electrode terminal 31 and the negative-electrode terminal 32 can be prevented.

As shown in FIGS. 9 and 10, the top protective cover 41 has a top protective cover body 414, a flange part 413 and a bulkhead 415.

The top protective cover body 414 has, in the form of the module 1, a top face and side faces that form a first housing part for terminals (housing space) 61, together with the first end face 34 and the first principal face 23 of the wiring board 2, to house the positive-electrode terminal 31 and the negative-electrode terminal 32.

The flange part 413 is integrally formed with the top protective cover body 414, and has a shape that extends from the skirt of the top protective cover body 414. Provided in the flange part 413 are a first engagement hole 411 and a second engagement hole 412 that engage, respectively, with a first engagement tab 4211a and second engagement tab 4221a, mentioned below, of the bottom protective cover 42. The first engagement hole 411 and second engagement hole 412 are provided in the flange part 413 on both sides of the top protective cover body 414 in a manner sandwiching the top protective cover body 414.

The bulkhead 415 is shaped as a sheet that has a longitudinal direction in the height direction of the protective cover 4 (Z-axis direction). The bulkhead 415 is placed at the center of the top protective cover body 414 in a manner dividing into two the first housing part for terminals (housing space that houses the positive-electrode terminal and the negative-electrode terminal) 61 of the top protective cover body 414. Because of the bulkhead 415, a top positive-electrode terminal housing part 511, and a top negative-electrode terminal housing part 521, which are isolated from each other, are formed. The first housing part for terminals 61 thus has the top positive-electrode terminal housing part 511 and the top negative-electrode terminal housing part 521, which are isolated from each other. The bulkhead 415 is provided between the positive-electrode terminal 31 and the negative-electrode terminal 32.

As shown in FIGS. 11 to 14, the bottom protective cover 42 has a bottom protective cover body 425, a first projecting part 421, and a second projecting part 422.

The bottom protective cover body 425 has a roughly rectangular solid shape. Provided on the top face side of the bottom protective cover body 425, along the longitudinal direction of the bottom protective cover body 425, are a first concaved part 423 and a second concaved part 424, both with a bottom. The top face of the bottom protective cover body 425 is placed, in the form of the module 1, in a manner facing the flange part 413 of the top protective cover 41 via the wiring board 2.

In the form of the module 1, the first concaved part 423 and the second concaved part 424 form, together with the second principal face 24 of the wiring board 2, a second terminal housing part (housing space) 62 that houses the positive-electrode terminal 31 and the negative-electrode terminal 32. The second terminal housing part 62 has a first concaved part 423 that will become the positive-electrode terminal housing part to house the end of the positive-electrode terminal 31, and a second concaved part 424 that will become the negative-electrode terminal housing part to house the end of the negative-electrode terminal 32, which are isolated from each other. By the wiring board 2 and the first concaved part 423, a bottom positive terminal housing part 512 that houses the end of the positive-electrode terminal 31 projecting from the second principal face 24 side of the wiring board 2, is formed. By the wiring board 2 and the second concaved part 424, a bottom negative terminal housing part 522 that houses the end of the negative-electrode terminal 32 projecting from the second principal face 24 side of the wiring board 2, is formed.

The first projecting part 421 and the second projecting part 422 are placed on both longitudinal ends of the bottom protective cover body 425, respectively, in a manner projecting in the Z-axis direction from the top face side of the bottom protective cover body 425. The projecting parts 421, 422 are integrally formed with the bottom protective cover body 425.

The first projecting part 421 has a first column part 4212, and a first guiding projection 4211 with a first engagement tab 4211a. The second projecting part 422 has a second column part 4222, and a second guiding projection 4221 with a second engagement tab 4221a.

The first column part 4212 and the second column part 4222 each have a semi-columnar shape whose cross-section, cut in parallel with the XY plane, is always a semi-circle (partial circle) of the same size.

The first guiding projection 4211 and the second guiding projection 4221 each have a frustoconical shape whose circular cross-sectional shape along the XY plane becomes continuously smaller along the direction in which the projecting parts 421, 422 are inserted into the engagement holes 411, 412 in the module 1 assembly step (direction from the negative side, toward the positive side, of the Z-axis in the figures).

By thus forming the tip of the first projecting part 421 (also the second projecting part 422) as the first guiding projection 4211 (also the second guiding projection 4221) whose surface is tapered, the first projecting part 421 (also the second projecting part 422) can be inserted smoothly into the first engagement through hole 21 (also the second engagement through hole 22) provided in the wiring board 2, and also into the first engagement hole 411 (also the second engagement hole 412) provided in the top protective cover 41.

The diameter of the circular bottom face of the first guiding projection 4211 (also the second guiding projection 4221) is the same as the diameter of the semi-circular top face of the first column part 4212 (and the second column part 4222). The first column part 4212 (also the second column part 4222) is stacked with the first guiding projection 4211 (also the second guiding projection 4221) in such a way the arc of the circular bottom face of the first guiding projection 4211 (also the second guiding projection 4221) partially overlaps the arc of the semi-circular top face of the first column part 4212 (second column part 4222), thereby constituting the first projecting part 421 (second projecting part 422).

The part extending from the first column part 4212 (also the second column part 4222) of the first guiding projection 4211 (also the second guiding projection 4221) becomes the first engagement tab 4211a (also the second engagement tab 4221a).

The protective cover 4 is constituted in such a way that the first engagement tab 4211a and second engagement tab 4221a of the bottom protective cover 42 hook, respectively, onto the open ends of the first engagement hole 411 and second engagement hole 412 provided in the flange part 413 of the top protective cover 41.

The first engagement tab 4211a (also the second engagement tab 4221a) of the first projecting part 421 (also the second projecting part 422) is thus locked by the open end of the first engagement hole 411 (also the second engagement hole 412) provided in the top protective cover 41, and the top protective cover 41 engages with the bottom protective cover 42 as a result. This allows for a difficult-to-disengage fixed constitution in that, even when a force is applied to the bottom protective cover 42 in the direction opposite the insertion direction of the first projecting part 421 and second projecting part 422 (direction from the positive side, toward the negative side, of the Z-axis in the figures), movement of the bottom protective cover 42 will be restricted because it is locked to the top protective cover 41 by the first engagement tab 4211a and second engagement tab 4221a, and consequently the top protective cover 41 and the bottom protective cover 42 cannot easily be separated from each other.

[Module Assembly]

The aforementioned module 1 is assembled as described below, for example.

First, the lithium ion capacitor 3 is placed horizontally on the first principal face 23 of the wiring board 2. As shown in FIGS. 7 and 8, the positive-electrode terminal 31 and negative-electrode terminal 32 are bent in an L shape so that the ends of the positive-electrode terminal 31 and negative-electrode terminal 32 face the wiring board 2. Next, the positive-electrode terminal 31 and negative-electrode terminal 32 are guided through the first terminal through hole 25 and second terminal through hole 26, respectively, from the first principal face 23 side, with the ends of the positive-electrode terminal 31 and negative-electrode terminal 32 led out in a manner projecting from the second principal face 24 side of the wiring board 2.

Next, the first projecting part 421 and second projecting part 422 of the bottom protective cover 42 are guided through the first engagement through hole 21 and second engagement through hole 22 in the wiring board 2, respectively, from the second principal face 24 side of the wiring board 2, with the tips of the first projecting part 421 and second projecting part 422 led out onto the first principal face 23 side of the wiring board 2, and the bottom protective cover 42 is placed on the second principal face 24 side. This way, the end of the positive-electrode terminal 31 projecting from the second principal face 24 is housed in the first concaved part 423, while the end of the negative-electrode terminal 32 projecting from the second principal face 24 is housed in the second concaved part 424.

Next, the top protective cover 41 is placed on the first principal face 23 side of the wiring board 2, with the first projecting part 421 inserted into the first engagement hole 411, and the second projecting part 422 inserted into the second engagement hole 412, in the top protective cover 41. The first projecting part 421 and second projecting part 422 are inserted until the engagement tab 4211a of the first projecting part 421 and the engagement tab 4221a of the second projecting part 422 hook onto the open ends of the first engagement hole 411 and second engagement hole 412 in the top protective cover 41, respectively, to cause the top protective cover 41 to engage with the bottom protective cover 42 and thereby assemble the module 1.

It should be noted that the assembly sequence is not limited to the foregoing.

As described above, in this embodiment a protective cover that covers the positive-electrode terminal and the negative-electrode terminal is provided and thus entry of foreign matter is prevented by the protective cover, and consequently short-circuiting between the positive-electrode terminal and the negative-electrode terminal, which would otherwise be caused by entry of foreign matter, can be prevented. Accordingly, rise in the temperature and pressure inside the lithium ion capacitor, which would otherwise be caused by an external short circuit, can be prevented. For example, a module free from problems caused by an external short circuit, such as a problem in which a lithium ion capacitor is disabled by the safety valve actuating due to an external short circuit occurring when the module is assembled into electronic equipment, can be provided in a stable manner.

Furthermore, because the protective cover is constituted in such a way that the positive-electrode terminal housing part and the negative-electrode terminal housing part are isolated from each other by the bulkhead and the concaved parts, direct contact between the positive-electrode terminal and the negative-electrode terminal can be prevented, and an external short circuit no longer occurs.

Also, the protective cover in this embodiment is constituted by the top protective cover and the bottom protective cover placed via the wiring board on one principal face and the other principal face of the board, respectively. This way, when the lithium ion capacitor is placed horizontally on the board and the positive-electrode terminal and negative-electrode terminal projecting from one end face of the lithium ion capacitor are bent in an L shape, the positive-electrode terminal and negative-electrode terminal positioned on one principal face side of the wiring board can be protected by the top protective cover, while the positive-electrode terminal and negative-electrode terminal positioned on the other principal face side of the wiring board can be protected by the bottom protective cover.

Also, the top protective cover and the bottom protective cover are constituted in a manner engaging with each other based on the engagement tabs provided on one hooking onto the other, and therefore the two cannot be easily separated from each other. As a result, the positive-electrode terminal and the negative-electrode terminal can be kept insulated from each other in a stable manner.

Second Embodiment

The form of the protective cover is not limited to the structure shown in the first embodiment.

In the first embodiment, the constitution is such that, when an external impact is applied to the module 1 due to dropping, etc., the protective cover 4 withstands the impact by the two projecting parts 421, 422.

In the second embodiment, on the other hand, the constitution is such that the bottom protective cover that constitutes a part of the protective cover further has a projecting part which is fitted into a concaved part provided in the wiring board. This constitution means that, when an external impact is applied to the module, the projecting part which is fitted into the concaved part (third projecting part 1426 mentioned below) receives the load, and consequently the external impact received by the two projecting parts 421, 422 can be reduced.

The module in the first embodiment is different from the module in the second embodiment in terms of the structure of the bottom protective cover 42, and consequently the structure of the wiring board.

As the constitution in the second embodiment is explained below, it should be noted that those parts that are constitutionally identical to the first embodiment are denoted using the same symbols and their explanation may be omitted.

Figure 15:
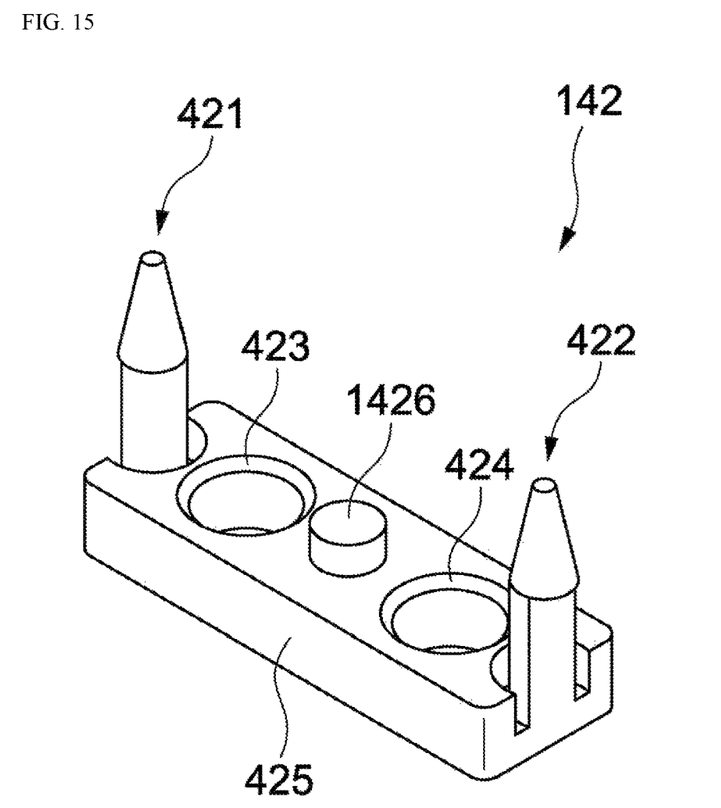
FIG. 15 is a perspective view, from above, of the bottom protective cover pertaining to the second embodiment.
Figure 16:
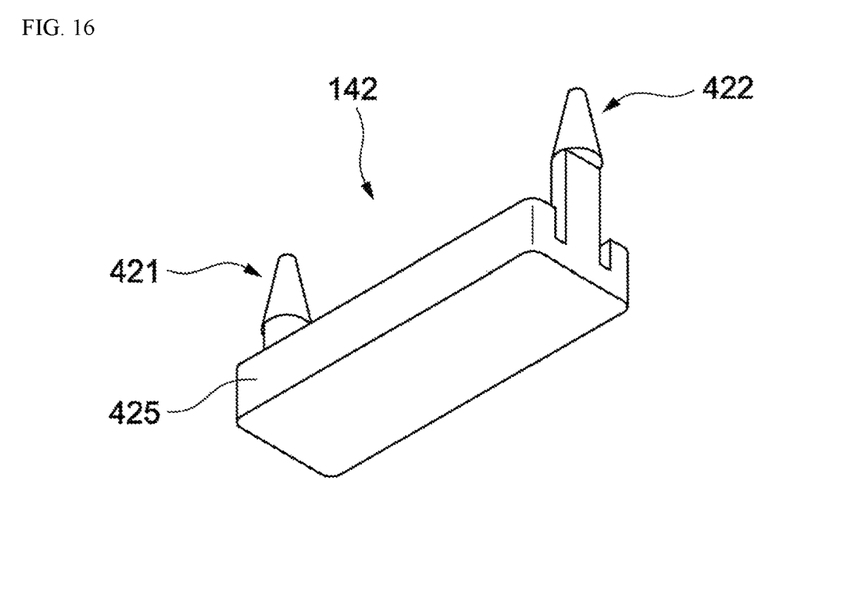
FIG. 16 is a perspective view, from below, of the bottom protective cover shown in FIG. 15.

FIG. 15 is a perspective view from above, while FIG. 16 is a perspective view from below, of the bottom protective cover constituting a part of the protective cover in this embodiment.

The module in this embodiment is constitutionally identical, in essence, to the module 1 described in the first embodiment, and has a wiring board, a lithium ion capacitor placed horizontally on the wiring board, and a protective cover that protects the positive-electrode terminal and negative-electrode terminal, both bent in an L shape, of the lithium ion capacitor.

The protective cover in this embodiment has a top protective cover and a bottom protective cover 142. The structure of the top protective cover is the same as that of the top protective cover 41 in the first embodiment.

The bottom protective cover 142 has a bottom protective cover body 425, a first projecting part 421, a second projecting part 422, and a third projecting part 1426.

The third projecting part 1426 is placed roughly at the center of the top face of the bottom protective cover body 425 in a manner projecting from the top face side. The third projecting part 1426 is integrally formed with the bottom protective cover body 425. The third projecting part 1426 is placed between the first concaved part 423 and the second concaved part 424. The third projecting part 1426 has a columnar shape, but its shape is not limited to the foregoing.

The module in this embodiment is different from the first embodiment in that a concaved part into which the third projecting part 1426 provided in the bottom protective cover 142 can be fitted, is provided in the wiring board. In the form of the module, the third projecting part 1426 is fitted into the concaved part provided in the wiring board. This means that, when an external impact is applied to the module due to dropping, etc., the protective cover receives the load via the third projecting part 1426 and thus the external impact received by the two projecting parts 421, 422 can be reduced, and consequently the strength against external impact improves. The concaved part provided in the wiring board to correspond to the third projecting part 1426 may have a bottom or it may be a through hole.

Also, in this embodiment, one third projecting part is provided which is fitted into the concaved part provided in the wiring board; however, the quantity is not limited to the foregoing and there may be multiple third projection parts. When one third projecting part is provided, a load generated by the bottom protective cover turning around the single point of the third projecting part may apply to the first projecting part 421 and second projecting part 422; when multiple third projecting parts are provided, on the other hand, the bottom protective cover is supported on the wiring board at two or more points and thus rotation of the bottom protective cover itself is suppressed, and accordingly any load applied to the first projecting part 421 and second projecting part 422 can be reduced.

The foregoing explained embodiments of the present invention; however, it goes without saying that the present invention is not limited to the aforementioned embodiments and various changes can be added, so long as the results do not deviate from the key points of the present invention.

For example, in the aforementioned embodiments, the engagement holes were provided in the top protective cover and the engagement tabs were provided on the bottom protective cover; however, the structure may be such that the engagement tabs are provided on the top protective cover and the engagement holes are provided in the bottom protective cover.

Also, in the aforementioned embodiments, the protective cover was constituted by two parts, namely, the top protective cover and the bottom protective cover; however, the constitution of the protective cover is not limited to the foregoing.

For example, the protective cover may be provided, as a first cover, only on one principal face side of the wiring board in a manner housing the positive-electrode terminal and negative-electrode terminal positioned on the one principal face side of the wiring board where the lithium ion capacitor is placed. And, the constitution may be such that the ends of the positive-electrode terminal and negative-electrode terminal that have been led out from the other principal face are protected by adhering insulating tapes in a manner covering these ends, to keep the terminals insulated from each other. In this case, for example, the constitution may be such that a projecting part with an engagement tab is provided on the protective cover placed on one principal face of the wiring board, while an engagement hole corresponding to this projecting part is provided in the wiring board, to allow the protective cover to engage with the wiring board. According to such constitution, the projecting part of the protective cover penetrates through the engagement hole in the wiring board, with the engagement tab projecting onto the second principal face side and hooking onto, and thereby locking with, the open end of the engagement hole in the wiring board.

In the case of a lithium ion capacitor module of horizontal type, the positive-electrode terminal and negative-electrode terminal placed on the principal face side (one principal face side) of the wiring board where the lithium ion capacitor is placed, are exposed more than are the positive-electrode terminal and negative-electrode terminal whose ends are led out to and placed on the other principal face side. As described above, by providing a protective cover at least on the principal face side of the wiring board where the positive-electrode terminal and negative-electrode terminal are more exposed, and by having the positive-electrode terminal and negative-electrode terminal housed in this protective cover, the chances of an external short circuit can be further reduced.

While the aforementioned embodiments were explained using an example where the electric storage device was a lithium ion capacitor, the electric storage device is not limited to a lithium ion capacitor. For example, the present invention can also be applied to an electric double-layer capacitor, lithium ion secondary battery, or other electric storage device whose positive-electrode terminal and negative-electrode terminal are placed on one end face.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-027988, filed Feb. 17, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A cover for an electric storage device comprising: (i) a container which is placed on a one principal face of a wiring board that has a first through hole for a terminal and a second through hole for a terminal, and which has a first end face orthogonal to the one principal face; and (ii) a positive-electrode terminal and a negative-electrode terminal, both projecting from the first end face and then being bent, with their ends penetrating through the first through hole for terminal and the second through hole for a terminal, respectively, and led out from another principal face of the wiring board, said cover comprising a first cover which is not part of the wiring board having the one principal face and is placed on the one principal face of the wiring board and which forms and defines, together with the first end face and the one principal face, an enclosed first housing part for terminals that accommodates therein the positive-electrode terminal and the negative-electrode terminal, wherein the container and the cover are placed on and in direct contact with a same plane of the one principal face of the wiring board, wherein said cover further comprises a second cover which is placed on the another principal face side, and forms, together with the other principal face, a second terminal housing part that houses the positive-electrode terminal and the negative-electrode terminal, and which can engage with the first cover.

2. The cover according to claim 1, wherein the first housing part for terminals has a positive-electrode terminal housing part that houses the positive-electrode terminal, and a negative-electrode terminal housing part that houses the negative-electrode terminal, which are isolated from each other.

3. The cover according to claim 2, wherein the first cover has a bulkhead that isolates the positive-electrode terminal housing part and the negative-electrode terminal housing part.

4. The cover according to claim 1, wherein the second terminal housing part has a positive-electrode terminal housing part that houses an end of the positive-electrode terminal, and a negative-electrode terminal housing part that houses an end of the negative-electrode terminal, which are isolated from each other.

5. The cover according to claim 1, wherein the first cover has an engagement hole, and the second cover has a projecting part with an engagement tab that penetrates through a through hole for engagement provided in the wiring board, and engages with the engagement hole.

6. A module comprising:
a wiring board having a first through hole for a terminal and a second through hole for a terminal;
an electric storage device comprising: (i) a container which is placed on a one principal face of the wiring board, and has a first end face and a second end face which are placed in a manner facing away from each other along an axial direction running in parallel with the wiring board; (ii) a positive-electrode terminal which projects from the first end face in the axial direction and is bent in a manner orthogonal to the axial direction, with an end of the positive-electrode terminal penetrating through the first through hole for a terminal and led out from another principal face of the wiring board; and (iii) a negative-electrode terminal which projects from the first end face in the one axis direction and is bent in a manner orthogonal to the axial direction, with an end of negative-electrode terminal penetrating through the second through hole for a terminal and led out from the another principal face of the wiring board; and
a cover comprising a first cover which is not part of the wiring board having the one principal face and is placed on the one principal face of the wiring board and forms and defines, together with the first end face and the one principal face, an enclosed first housing part for terminals that accommodates therein the positive-electrode terminal and the negative-electrode terminal, wherein the container and the cover are placed on and in direct contact with a same plane of the one principal face of the wiring board, wherein said cover further comprises a second cover which is placed on the another principal face side, and forms, together with the other principal face, a second terminal housing part that houses the positive-electrode terminal and the negative-electrode terminal, and which can engage with the first cover.

7. The module according to claim 6, wherein the first housing part for terminals has a positive-electrode terminal housing part that houses the positive-electrode terminal, and a negative-electrode terminal housing part that houses the negative-electrode terminal, which are isolated from each other.

8. The module according to claim 6, wherein the second terminal housing part has a positive-electrode terminal housing part that houses an end of the positive-electrode terminal, and a negative-electrode terminal housing part that houses an end of the negative-electrode terminal, which are isolated from each other.

9. The module according to claim 6, wherein the wiring board has a through hole for engagement, the first cover has an engagement hole, and the second cover has a projecting part with an engagement tab that penetrates through the through hole for engagement and the engagement hole, and engages with the engagement hole.

10. A cover for an electric storage device comprising: (i) a container which is placed on a one principal face of a wiring board that has a first through hole for a terminal and a second through hole for a terminal, and which has a first end face orthogonal to the one principal face; and (ii) a positive-electrode terminal and a negative-electrode terminal, both projecting from the first end face and then being bent, with their ends penetrating through the first through hole for terminal and the second through hole for a terminal, respectively, and led out from another principal face of the wiring board, said cover comprising a first cover which is not part of the wiring board having the one principal face and is placed on the one principal face of the wiring board and which forms and defines, together with the first end face and the one principal face, an enclosed first housing part for terminals that accommodates therein the positive-electrode terminal and the negative-electrode terminal, wherein the container and the cover are placed on a same plane of the one principal face of the wiring board, wherein said cover further comprises a second cover which is placed on the another principal face side, and forms, together with the other principal face, a second terminal housing part that houses the positive-electrode terminal and the negative-electrode terminal, and which can engage with the first cover, and the first cover has an engagement hole, and the second cover has a projecting part with an engagement tab that penetrates through a through hole for engagement provided in the wiring board, and engages with the engagement hole.

* * * * *